United States Patent
Iwashita et al.

(10) Patent No.: US 8,877,834 B2
(45) Date of Patent: Nov. 4, 2014

(54) CARBON FIBER-REINFORCED RESIN COMPOSITION

(75) Inventors: Toru Iwashita, Utsunomiya (JP); Toshiyuki Ishii, Sodegaura (JP); Rikuo Onishi, Ichihara (JP)

(73) Assignee: Prime Polymer Co., Ltd., Tokyo (JP)

( * ) Notice: Subject to any disclaimer, the term of this patent is extended or adjusted under 35 U.S.C. 154(b) by 147 days.

(21) Appl. No.: 13/395,301

(22) PCT Filed: Sep. 8, 2010

(86) PCT No.: PCT/JP2010/005503
§ 371 (c)(1),
(2), (4) Date: Jun. 1, 2012

(87) PCT Pub. No.: WO2011/030544
PCT Pub. Date: Mar. 17, 2011

(65) Prior Publication Data
US 2012/0238688 A1  Sep. 20, 2012

(30) Foreign Application Priority Data

Sep. 9, 2009  (JP) .................. 2009-208078

(51) Int. Cl.
*C08K 9/08* (2006.01)
*C08L 23/02* (2006.01)
*C08L 23/08* (2006.01)
*C08L 23/10* (2006.01)
*C08L 51/06* (2006.01)

(52) U.S. Cl.
CPC . *C08L 23/02* (2013.01); *C08K 9/08* (2013.01); *C08L 23/0869* (2013.01); *C08L 23/10* (2013.01); *C08L 2205/16* (2013.01); *C08L 51/06* (2013.01)
USPC .......................................... 523/205; 523/215

(58) Field of Classification Search
CPC ....... C08K 9/08; C08L 23/26; C08L 2205/16; C08L 23/02; C08L 23/0869
USPC .................................. 523/205, 215; 526/272
See application file for complete search history.

(56) References Cited

U.S. PATENT DOCUMENTS

| 4,121,026 A | * | 10/1978 | Cheng et al. ............... 525/327.6 |
| 2008/0009580 A1 | * | 1/2008 | Sugawara et al. ........... 524/496 |
| 2009/0062426 A1 | * | 3/2009 | Shiraki et al. ............... 523/205 |

FOREIGN PATENT DOCUMENTS

| CN | 1632217 A | 6/2005 |
| JP | 57-16041 | 1/1982 |
| JP | 2-84566 | 3/1990 |
| JP | 6-107442 | 4/1994 |
| JP | 2005-89706 | 4/2005 |
| JP | 2005-125581 | 5/2005 |
| JP | 2005-213478 | 8/2005 |
| JP | 2005-213479 | 8/2005 |
| JP | 2006-124847 | 5/2006 |
| WO | WO 2006/101269 A1 | 9/2006 |
| WO | WO 2008/114459 A1 | 9/2008 |

OTHER PUBLICATIONS

International Preliminary Report on Patentability and Written Opinion issued Apr. 19, 2012, in PCT/JP2010/005503 filed Sep. 8, 2010 (submitting English translation only).
International Search Report issued Dec. 14, 2010, in PCT/JP2010/005503 (submitting English translation only).
Combined Office Action and Search Report issued Dec. 26, 2012 in Chinese Patent Application No. 201080040301.7 with English translation of categories of cited documents.

* cited by examiner

*Primary Examiner* — Vickey Nerangis
(74) *Attorney, Agent, or Firm* — Oblon, Spivak, McClelland, Maier & Neustadt, L.L.P.

(57) ABSTRACT

A carbon fiber-reinforced resin composition including (A) a polyolefin resin, (B) an acid-modified polyolefin resin and (C) modified carbon fibers of which the adhesion amount of an amino group-containing modified polyolefin resin is 0.2 to 5.0 mass %, wherein the mass ratio of (A):(B) is 0 to 99.5:100 to 0.5 and the mass ratio [(A)+(B)]:(C) is 40 to 97:60 to 3.

28 Claims, No Drawings

CARBON FIBER-REINFORCED RESIN COMPOSITION

TECHNICAL FIELD

The invention relates to a carbon fiber-reinforced resin composition and a shaped body obtained using the same.

BACKGROUND ART

It is known that a carbon fiber-reinforced resin composition has conventionally been used as an alternative for a metal or a glass-fiber reinforced composition. For example, they have been used as automobile components, household equipment components or the like. However, as compared with a metal or a glass fiber-reinforced composition, a carbon fiber-reinforced resin composition has poor strength, and hence, the range in which it is used as an alternative was limited. The reason therefor is that, since a polyolefin resin is non-polar resin, interface adhesion of carbon fibers is poor. Therefore, carbon fibers cannot exhibit effects of improving the strength as a reinforcing agent sufficiently.

As a method for improving the interface adhesion of polyolefin resins and carbon fibers, a method in which an acid-modified polyolefin resin is added to a matrix resin, a method in which carbon fibers are subjected to a sizing treatment by using a sizing agent formed of a polyolefin resin and a silane coupling agent, and, as disclosed in Patent Documents 1 to 3, a method in which carbon fibers are subjected to a sizing treatment by a sizing agent which comprises acid-modified polypropylene as an essential component are known.

However, in the method in which an acid-modified polyolefin resin is added to a matrix resin, a large amount of an acid-modified polyolefin resin is required to be added. Therefore, it can not necessarily be a good method in respect of recycling property and economy. In a method in which a sizing treatment is conducted by a sizing agent containing a silane coupling agent, effects of improving interface adhesion are not significant since carbon fibers contain not so many hydroxyl groups on the surface as compared with glass fibers. Further, a method in which a sizing treatment is conducted by a sizing agent containing acid-modified polypropylene as essential components attains a relatively good interface adhesion to glass fibers. However, in the case of carbon fibers, such effects are not sufficient.

RELATED ART DOCUMENTS

Patent Documents

Patent Document 1: JP-A-H06-107442
Patent Document 2: JP-A-H02-84566
Patent Document 3: JP-A-2006-124847

SUMMARY OF THE INVENTION

An object of the invention is to provide a carbon fiber-reinforced resin composition having improved strength properties such as tensile stress at break and bending strength.

According to the invention, the following carbon fiber-reinforced resin composition, resin composition and shaped product formed thereof are provided.
1. A carbon fiber-reinforced resin composition comprising (A) a polyolefin resin, (B) an acid-modified polyolefin resin and (C) modified carbon fibers of which the adhesion amount of an amino group-containing modified polylolefin resin is 0.2 to 5.0 mass %, wherein the mass ratio of (A):(B) is 0 to 99.5:100 to 0.5 and the mass ratio [(A)+(B)]:(C) is 40 to 97:60 to 3.
2. The carbon fiber-reinforced resin composition according to 1 wherein the mass ratio of (A):(B) is 80 to 99:20 to 1.
3. The carbon fiber-reinforced resin composition according to 1 or 2, wherein the mass ratio of [(A)+(B)]:(C) is 50 to 95:50 to 5.
4. The carbon fiber-reinforced resin composition according to any of 1 to 3, wherein the modified carbon fibers (C) are obtained by allowing the amino group-containing modified polyolefin resin to adhere to the surface of carbon fibers, followed by a heat treatment at 200 to 300° C. for 5 seconds to 3 minutes.
5. The carbon fiber-reinforced resin composition according to any of 1 to 3, wherein the modified carbon fibers (C) are obtained by allowing the amino group-containing modified polyolefin resin to adhere to the surface of carbon fibers, followed by a heat treatment at 220 to 240° C. for 20 seconds to 40 seconds.
6. The carbon fiber-reinforced resin composition according to any of 1 to 5, wherein the amino group-containing modified polyolefin resin has a limiting viscosity measured in tetralin of 135° C. of 0.05 to 1.0 dL/g.
7. The carbon fiber-reinforced resin composition according to any of 1 to 6, wherein the amino group-containing modified polyolefin resin is a reaction product of a compound selected from the group consisting of an ethylene-ethylacrylate-maleic anhydride copolymer, a maleic anhydride graft polyethylene-based resin and a maleic anhydride graft polypropylene-based resin and a compound having two or more amino groups.
8. The carbon fiber-reinforced resin composition according to any of 1 to 7, wherein the amino group-containing modified polyolefin resin has an amino group and, is a copolymer having within its molecule 70 to 99.98 mol % of a repeating unit represented by the following formula (I) and 0.02 to 30 mol % of a repeating unit represented by the following formula (II):

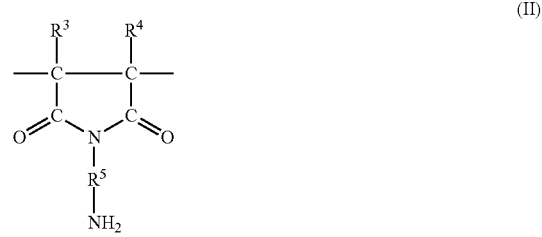

wherein in the formulas (I) and (II), $R^1$ and $R^2$ are independently a hydrogen atom, an alkyl group having 1 to 10 carbon atoms, a cycloalkyl group having 3 to 8 carbon atoms, an aryl group having 6 to 10 carbon atoms, an alkoxy group having 1 to 4 carbon atoms, an alkoxycarbonyl group having 1 to 18 carbon atoms or an alkylcarboxyl group having 1 to 17 carbon atoms; $R^3$ and $R^4$ are independently a hydrogen atom or an alkyl group having 1 to 6 carbon atoms; $R^5$ is an alkylene group having 1 to 12 carbon atoms, a cycloalkylene group having 5 to 17 carbon atoms, an arylene group having 6 to 12 carbon atoms, an arylalkylene group having 7 to 12 carbon atoms or a polyoxyalkylene group having 4 to 30 carbon atoms, and $R^1$ to $R^5$ may be the same or different in each repeating unit.

9. A resin composition comprising the carbon fiber-reinforced resin composition according to any of 1 to 8 and a thermoplastic resin, wherein the modified carbon fiber (C) is contained in an amount of 3 to 60 mass %.

10. A shaped product which is produced from the carbon fiber-reinforced resin composition according to any of 1 to 8 or the resin composition according to 9.

According to the invention, by using modified carbon fibers of which the adhesion amount of an amino group-containing modified polyolefin resin is 0.2 to 5.0 mass %, interface adhesion of carbon fibers to a polyolefin resin is improved, whereby strength properties (tensile stress at break and bending strength) of the carbon fiber-reinforced resin composition can be improved.

MODE FOR CARRYING OUT THE INVENTION

The carbon fiber-reinforced resin composition of the invention comprises (A) a polyolefin resin, (B) an acid-modified polyolefin resin and (C) modified carbon fibers of which the adhesion amount of an amino group-containing modified polyolefin resin is 0.2 to 5.0 mass %.

Examples of the polyolefin resin (A) include a homopolymer of α-olefin such as ethylene, propylene, butane-1,3-methylbutene-1,4-methylbutene-1 and octene-1 or a copolymer thereof or a copolymer of these and other co-polymerizable unsaturated monomers. Examples of the copolymer include a block copolymer, a random copolymer and a graft copolymer.

Specific examples include polyethylene-based resins such as high-density, middle-density and low-density polyethylene, a straight-chain low-density polyethylene, an ethylene-vinyl acetate copolymer and an ethylene-acrylic acid ethyl copolymer, polypropylene-based resins such as polypropylene, an ethylene-propylene block copolymer or random copolymer, an ethylene-propylene-butene-1 copolymer, polybutene-1 and poly-4-methylpentene-1.

These polyolefin resins may be used alone or in a mixture. A polypropylene-based resin is preferable.

A commercially available polypropylene-based resin can be used. Also, a polypropylene-based resin of which the fluidity has been adjusted with an organic peroxide can be used.

A melt flow rate (MFR) is preferably 10 to 500 g/10 minutes, more preferably 60 to 300 g/10 minutes, and further preferably 100 to 200 g/10 minutes (measured at 230° C. under a load of 2.16 kg according to JIS K7210). If the MFR is smaller than 10 g/10 min, dispersibility of reinforced fibers in a shaped product is lowered, whereby the appearance of a shaped product may be deteriorated. A MFR larger than 500 g/10 min is not preferable since impact strength is lowered.

The above-mentioned polyolefin resin may contain a rubber such as ethylene-α-olefin-based copolymer rubber, ethylene-α-olefin-non-conjugated diene-based copolymer rubber (EPDM, for example), ethylene-aromatic monovinyl compound-non-conjugated diene-based copolymer rubber, and a hydrogenated product thereof.

A modified polyolefin resin (B) which is modified with an acid such as an unsaturated carboxylic acid or its derivative can improved interface adhesion between modified carbon fibers and the modified polyolefin resin (B) and interface adhesion between modified carbon fibers and a polyolefin resin, whereby strength properties such as tensile stress at break and bending strength are significantly improved.

Although the polyolefin resins to be modified may be the same or different from the above-mentioned polyolefin resin (A), the polyolefin resin to be modified is preferably the same as the above-mentioned polyolefin resin. For example, a polyethylene-based resin and a polypropylene-based resin are preferable, with polypropylene being particularly preferable.

As the acid used for modification, an unsaturated carboxylic acid such as acrylic acid, methacrylic acid, maleic acid, fumaric acid, itaconic acid, crotonic acid, citraconic acid, sorbic acid, mesaconic acid and angelic acid can be given. Derivatives of these unsaturated carboxylic acids can also be used. Examples of such derivatives include acid anhydrides, esters, amides, imides and metal salts. For examples, maleic anhydride, itaconic anhydride, methyl acrylate, methyl methacrylate, ethyl acrylate, propyl acrylate, butyl acrylate, ethyl maleate, acrylamide, maleic amide, sodium acrylate and sodium methacrylate can be given.

Of these, unsaturated dicarboxylic acid or its derivatives are preferable, with maleic anhydride being further preferable. These unsaturated carboxylic acids or its derivatives may be used singly or in combination of two or more. No specific restrictions are imposed on the method of modification, and a known method is used. For example, a method in which a polyolefin resin is dissolved in a solvent, an unsaturated carboxylic acid or its derivatives and a radical generator are added, followed by heating and stirring, a method in which the components are supplied to an extruder to allow them to be subjected to graft polymerization can be given.

The acid content of unsaturated carboxylic acid or its derivatives in the acid-modified polyolefin resin is preferably 0.1 to 10 mass %, more preferably 0.8 to 8 mass %. The acid content is determined from the peak area of 1670 $cm^{-1}$ to 1810 $cm^{-1}$ of an IR spectrum of a resin.

The limiting viscosity [η] of the acid-modified polyolefin resin measured in tetralin at 135° C. is preferably 0.1 to 3.0 dL/g. If the limiting viscosity is less than 0.1 dL/g, the physical properties such as strength properties of a shaped product may be deteriorated. On the other hand, if the limiting viscosity exceeds 3.0 dL/g, fluidity of the composition may become poor, leading to difficulty in shaping.

In the invention, modified carbon fibers (C) of which the adhesion amount of an amino group-containing modified polyolefin resin is 0.2 to 5.0 mass % are used.

The method of allowing the amino group-containing modified polyolefin resin to be adhered will be mentioned in detail later. However, a method in which an aqueous dispersion of a sizing agent containing an amino group-containing modified polylolefin resin is used as a sizing agent, and the aqueous dispersion of a sizing agent is adhered to the carbon fiber bundle (hereinafter, this method is referred to as the "sizing treatment") is preferable.

The adhesion amount of the amino group-containing modified polyolefin is 0.2 to 5.0 mass %, preferably 0.4 to 4.0 mass %, with 0.5 to 4.0 mass % being more preferable. If the adhesion amount is within the above-mentioned range, the number of molecule layers covering the surface of single fibers of carbon fibers becomes preferable, i.e. around 1 to 3 layers. If the adhesion amount is less than 0.2 mass %, effects of allowing the amino group-containing modified polyolefin resin to be adhered may be insufficient, leading to lowering in passage properties, handling properties and affinity with a sizing agent. On the other hand, if the adhesion amount exceeds 5 mass %, the amino group-containing modified polyolefin resin is present among the single fibers to cause bridging. As a result, movement among the single fibers is restricted due to pseudocontact of the single fibers, whereby spreading property of carbon fiber bundles may tend to be lowered. As a result, uniformity of carbon fiber bundles may be deteriorated. In addition, permeability of the sizing agent is inhibited, uniform modified carbon fiber bundles cannot be obtained easily, and as a result, properties of carbon fiber bundles may be deteriorated.

The adhesion amount of the amino group-containing modified polyolefin resin can be adjusted by controlling the concentration of solid matters of an aqueous dispersion of a sizing agent containing the amino group-containing modified polyolefin resin, for example. Specifically, the adhesion amount tends to be increased by increasing the solid matter concentration of an aqueous dispersion of a sizing agent.

The adhesion amount of the amino group-containing modified polyolefin resin is calculated according to SRM14-90 of the SACMA method. Specifically, the total amount of the sizing agent which has adhered to the carbon fiber bundle is measured based on a difference in mass before and after the thermal decomposition treatment by the thermal decomposition method, and the amount is calculated as the ratio of adhesion to the carbon fiber bundle before the heat decomposition treatment. Specifically, the adhesion amount is calculated by the following formula (1). When the amino group-containing modified polyolefin resin and other components are used in combination as the sizing agent, the adhesion amount of the amino group-containing modified polyolefin resin is calculated from the mass ratio of the amino group-containing modified polyolefin resin relative to the solid matters in the aqueous dispersion of the sizing agent. If a pre-sizing treatment is conducted before a sizing treatment, an increase from the adhesion amount of a pre-sizing agent relative to the adhesion amount is calculated as the total amount of a sizing agent, and obtained according to the following formula (1):

Adhesion amount(%): $100 \times (W1-W2)/W1$      (1)

W1: Mass of carbon fibers before thermal decomposition treatment

W2: Mass of carbon fibers after thermal decomposition treatment

When the amino group-containing modified polyolefin resin (hereinafter often referred to as the "compound (a)" are conjugated with the modified carbon fiber bundle and the polyolefin resin and the acid-modified polyolefin resin (the both are often comprehensively referred to as the "polyolefin-based resin") the amino group in the molecule of the amino group-containing modified polyolefin resin enhances the interaction with the surface of the carbon fiber bundle. It is a component which serves as an effective coupling agent which causes strong bonding with a polyolefin-based resin due to strong interaction between the compound (a) and the acid-modified polyolefin resin and the interwining of molecules of the skeleton of these.

In the compound (a), the main chain is formed of a carbon-carbon bonding and has an amino group on at least part of the terminal of the side chain or the main chain.

Specific examples of the compound (a) include a reaction product of (i) acid-modified polyolefin resins (hereinafter often referred to as the "compound b") and a compound having an amino group and (ii) a reaction product of an epoxylated polyolefin resin (hereinafter often referred to as the "compound (c)") and a compound having an amino group.

In particular, since a reaction product of the compound (b) or the compound (c) and the compound having two or more amino groups has a primary amino group, it is suitable as the compound (a). Due to the presence of a primary amino group, good interaction can be attained on the polyolefin-based resin or the surface of carbon fibers, and hence stronger bonding is generated.

No specific restrictions are imposed on the compound (b) as long as it is modified with an acid such that it has a functional group which reacts with an amino group. The polyolefin skeleton may be an olefin such as ethylene, propylene and butene or may be a plurality of different olefins. Examples of the olefin include an olefin having 2 to 8 carbon atoms.

As such compound (b), the following compounds can be given, for example.

(1) Compound (b-1)

An acid-modified polyolefin resin having a skeleton represented by the following formulas (I) and (III).

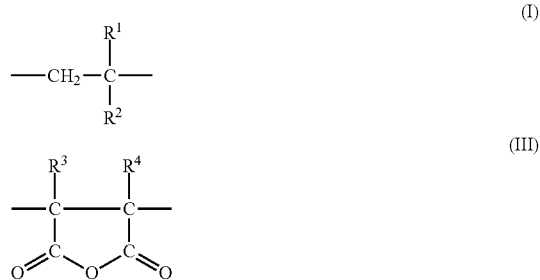

In the formula (I), $R^1$ and $R^2$ are independently a hydrogen atom, an alkyl group having 1 to 10 carbon atoms, a cycloalkyl group having 3 to 8 carbon atoms, an aryl group having 6 to 10 carbon atoms, an alkoxy group having 1 to 4 carbon atoms, an alkoxycarbonyl group having 1 to 18 carbon atoms or an alkylcarboxyl group having 1 to 17 carbon atoms.

In the formula (III), $R^3$ and $R^4$ are independently a hydrogen atom or an alkyl group having 1 to 6 carbon atoms.

In each repeating unit, $R^1$ to $R^4$ may be the same or different.

The acid-modified polyolefin resin having a skeleton represented by the formula (I) and a skeleton represented by the formula (III) can be obtained by copolymerizing olefin and maleic anhydride, for example. Further, copolymerization may be conducted while dehydrating olefin and maleic acid. In this case, copolymerization can be conducted together with other unsaturated carboxylic acids. Examples of the unsaturated carboxylic acid include unsaturated carboxylic acids such as acrylic acid, methacrylic acid, fumaric acid, and itaconic acid; acrylic esters such as methyl acrylate, ethyl acrylate and propyl acrylate; unsaturated carboxylic esters such as methyl methacrylate, ethyl methacrylete and propyl methacrylete, and unsaturated carboxylic acid such as vinyl acetate. They can be used singly or in combination of two or more.

Specific examples of the acid-modified polyolefin resin having a skeleton represented by the formula (I) and a skeleton represented by the formula (III) include an ethylene-maleic anhydride copolymer, a propylene-maleic anhydride copolymer, an ethylene-propylene-maleic anhydride copolymer, an ethylene-ethyl acrylate-maleic anhydride copolymer and an ethylene-vinyl acetate-maleic anhydride copolymer.

(2) Compound (b-2)

An acid-modified polyolefin resin having a skeleton represented by the above-mentioned formula (I) in its main chain and a group represented by the following formula (IV) in its side chain.

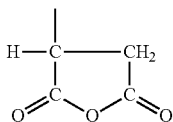
(IV)

As the acid-modified polyolefin resin having a skeleton represented by the formula (I) in its main chain and a group represented by the formula (IV) in its side chain, an acid-modified polyolefin resin obtained by reacting maleic acid or maleic anhydride with a polyolefin resin by melt kneading or the like together with a radical initiator can be given.

Here, as the polyolefin resin, for example, a polyolefin resin obtained by polymerizing an olefin (singly or plurally) such as ethylene, propylene and butene in the presence of a polymerization catalyst such as the so-called Ziegler-Natta catalyst can be given. A polypropylene homopolymer is preferable.

No specific restrictions are imposed on the radical initiator. For example, butyl peroxide, dicumyl peroxide, benzoyl oxide or the like can be given. It suffices that the radical initiator be used in an amount of about 0.01 to 1 part by mass relative to 100 parts by mass of the polyolefin resin.

The temperature of melt kneading is generally around 160 to 270° C.

(3) Compound (b-3)

An acid-modified polyolefin resin having a skeleton represented by the above formula (I) in its main chain and having a skeleton represented by the following formula (V) in its side chain.

(V)

The acid-modified polyolefin resin having a skeleton represented by the above formula (I) in its main chain and having a skeleton represented by the following formula (V) in its side chain is obtained by copolymerizing an olefin and unsaturated carboxylic acid or by copolymerizing an olefin and an unsaturated carboxylic acid ester, followed by hydrolysis.

As the unsaturated carboxylic acid, acrylic acid, methacrylic acid and fumaric acid or the like can be given. On the other hand, as the unsaturated carboxylic acid ester, an acrylic acid ester such as methyl acrylate, ethyl acrylate and propyl acrylate, a methacrylic acid ester such as methyl methacrylate, ethyl methacrylete and propyl methacrylate and vinyl acetate or the like can be given.

As the usable olefin, the olefins exemplified above can be given. No specific restrictions are imposed on polymerization conditions and hydrolysis conditions, and a known method can be used.

In the compounds (b-1) and (b-3), it is preferred that the structural unit represented by the above formula (I) be contained in an amount of 70 to 99.98 mol % and the structural unit derived from a compound for introducing the group represented by the above formula (III) or the above formula (V) corresponding to each compound be contained in an amount of 0.02 to 30 mol %. In the compound (b-2), it is preferred that the group represented by the above formula (IV) be contained in an amount of 0.5 to 20 mass %.

In each compound, if the content of the structural unit and the content of the group are respectively less than the above-mentioned lower limit, adhesiveness with carbon fibers becomes insufficient, and if the content of the structural unit and the content of the group respectively exceed the above-mentioned upper limit, affinity for polyolefin becomes insufficient.

The compound (b) may contain a repeating unit other than those represented by the above formula (I) or (III) or a side chain other than those represented by the above formula (IV) or (V) within a range that the advantageous effects of the invention are not impaired.

As the above-mentioned compound (b), one compound selected from the group consisting of an ethylene-ethyl acrylate-maleic anhydride copolymer, a maleic anhydride graft polyethylene-based resin and a maleic anhydride graft polypropylene-based resin can be given, for example.

As the compound (b), a commercially available compound can be used. For example, Yumex series manufactured by Sanyo Chemical Industries, Ltd. (product name, maleic anhydride graft polyethylene, maleic anhydride graft polypylene), Bondine series manufactured by Atofina Co. Ltd. (product name, ethylene-ethyl acrylate-maleic anhydride copolymer), Rexpearl ET series manufactured by Japan Polyolefin Corporation (product name, an ethylene-ethyl acrylate-maleic anhydride copolymer), Hostamont AR503 and Ar504 manufactured by Clariant Japan (product name, maleic anhydride graft polypropylene) can be given, for example.

As preferable compound (c), a compound obtained by copolymerizing an epoxy group-containing monomer such as glycidyl methacrylate, methylglycidyl methacrylate, 3,4-epoxycyclohexylmethyl acrylate and 3,4-epoxycyclohexylmethyl methacrylate with an olefin can be given.

As the polyolefin skeleton, an olefin such as ethylene, propylene and butene may be used singly or in the form of a copolymer thereof. Further, copolymerization may be random copolymerization or block copolymerization.

Although the mass molecular weight of the compound (b) and the compound (c) can be appropriately selected according to purpose, it is normally 3000 to 600,000.

As the compound having an amino group to be reacted with the compound (b) or the compound (c), a compound having two or more amino groups is preferable. Specifically, a diamine represented by the following formula (VI) can be given.

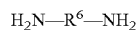
(VI)

In the formula (VI), $R^6$ is an alkylene group having 1 to 12 carbon atoms (preferably an alkylene group having 1 to 8 carbon atoms), a cycloalkylene group having 5 to 17 carbon atoms (preferably a cycloalkylene group having 6 to 10 carbon atoms), an arylene group having 6 to 12 carbon atoms, an arylalkylene group having 7 to 12 carbon atoms (preferably an arylalkylene group having 8 to 10 carbon atoms or a polyoxyalkylene group having 4 to 30 carbon atoms (preferably a polyoxyalkylene group having 4 to 15 carbon atoms).

As the alkylene group, a methylene group, an ethylene group, a propylene group, a tetramethylene group, a hexamethylene group or the like can be given. As the cycloalkylene group, a cyclohexylene group, a methylene cyclohexyl methylene group or the like can be given.

As the arylene group, phenylene, oxydiphenylene or the like can be given.

As the arylalkylene group, xylylene or the like can be given.

As the polyoxyalkylene group, a polyoxymethylene group, a polyoxyethylene group, a polyoxypropylene group or the like can be given.

Specific examples of the diamine include straight-chain or branched aliphatic alkylenediamines such as ethylenediamine, 1,3-diaminopropane, 1,4-diaminobutane, 1,5-diaminopentane, hexamethylenediamine, 1,7-diaminoheptane, 1,8-diaminooctane, 1,9-diaminononane, 1,10-diaminodecane, piperadinylaminoethane, 2,2,5-trimethylhexanediamine, and 2,2,4-trimethylhexanediamine; alicyclic diamines such as isophorone diamine, 1,3-bis(aminomethyl)cyclohexane, bis(4-aminocyclohexyl)methane, bisaminomethylhexahydro-4,7-methaneindane, 1,4-cyclohexanediamine, 1,3-cyclohexanediamine, 2-methylcyclohexanediamine, 4-methylcyclohexanediamine, bis(4-amino-3,5-dimethylcyclohexyl)methane; arylalkyldiamines such as m-xylylenediamine and p-xylylenediamine; aryldiamines such as p-phenylenediamine and 4,4'-diaminodiphenylether; and polyoxyalkylenediamine such as polyoxypropylenediamine and polyoxyethylenediamine. Of these, aliphatic and alicyclic diamines are particularly preferable. Here, salts of these diamines are used. Although the salts may be partially-neutralized (mono salts) or completely-neutralized (di salts), partially-neutralized salts are preferable in respect of high reaction efficiency.

The above-mentioned diamine is preferably used as partially-neutralized salts of an acid. As such an acid, it is desirable to select an acid having a larger acid strength than that of carboxylic acid. Specific examples include sulfonic acid such as sulfuric acid, benzenesulfonic acid, toluenesulfonic acid and naphthalenesulfonic acid; halogenoc acid such as hydrochloric acid, hydrofluoric acid, hydrobromic acid and hydriodic acid; nitric acid, boronic acid and phosphoric acid. Of these, hydrochloric acid or toluenesulfonic acid is preferable.

In producing a salt of the diamine compound, it is preferable to produce a salt in such a form that the molar ratio of the above-mentioned diamine and the above-mentioned acid will correspond to the degree of neutralization of 50 to 100% in terms of acid equivalence based on the total number of amino groups in the diamine. If the molar ratio is less than 50%, cross linking or gelation tends to occur easily during the reaction. If the molar ratio exceeds 100%, a long period time is taken for the reaction, leading to economical disadvantage. A more preferable range is 50 to 80%.

A salt of the diamine can be easily prepared by a neutralization reaction between the corresponding diamine and the corresponding acid. For example, diamine is added dropwise to an alcohol solution of an acid, and the resulting solution is concentrated according to need. Then, the salt is re-crystallized from alcohol and isolated, and the isolated salt may be used as raw material. Alternatively, a partially-neutralized salt of diamine and an acid is formed in a non-protonic polar solvent such as 1,3-dimethyl-2-imidazolidinone (DMI), N-methyl-2-pyrrolidone, dimethylsulfoxide (DMSO), dimethylsolfone, dioxane, 1,2-dimethoxyethane, hexamethylenephosphoric acid-triamide and tetramethylurea, and the resulting salt may be used in a reaction as it is. In respect of easiness in handling, the latter is preferable.

The compound (a) is obtained by allowing the compound (b) or the compound (c) to react with the diamine by a known method.

The reaction between the compound (b-1) or the compound (b-2) and the diamine is an imidazation reaction, and the reaction between the compound (b-3) and the diamine is an acid amidation reaction.

Although no particular restrictions are imposed on the reaction method, the compound (a) can be produced efficiently for example by a method in which the compound (b) and the salt of the diamine is allowed to react (an imidization reaction or an acid amidization reaction), and the resulting reaction product is allowed to be in contact with a base to conduct deoxidation.

The imidization reaction or the acid amidization reaction can be conducted in a non-solvent molten state by means of a screw extruder or the like. In order to allow the reaction to proceed uniformly, it is desirable to use an inactive solvent. Examples of the solvent which can be used for such a purpose include aromatic hydrocarbons such as benzene, toluene, xylene, cumene, cymene, ethyl toluene, propylbenzene, and diethylbenzene; alicyclic hydrocarbons such as methylcyclopentane, cyclohexane, ethylcyclopentane, methylcyclohexane, 1,1-dimethylcyclohexane and ethylcyclohexane; aliphatic hydrocarbons such as hexane, heptane, octane, decane, methylheptane, 3-ethylhexane and trimethylpentane; and a non-protonic polar solvent such as DMI, tetramethylurea, dimethylsulfone, dioxane, 1,2-dimethoxyethane, hexamethylene phosphoric triamide, DMSO, and N-methyl-2-pyrrolidone.

In the imidization reaction or the acid amide reaction, since reactants which greatly differ in polarity are allowed to react, it is generally preferable to use a non-polar solvent and a polar solvent simultaneously.

The amount of the solvent is not particularly restricted, and may be appropriately selected according to circumstances. Normally, the amount may be determined within a mass ratio of 0.3 to 20 times, preferably 1 to 10 times relative to the compounds (b-1) to (b-3) used as the raw materials (that is, a compound having a substituted or unsubstituted succinic anhydride group or a substituted or unsubstituted carboxyl group as a functional group, which reacts with an amino group.). If the amount ratio is smaller than 0.3 times, since the effects of dilution become insufficient, the reaction mixture becomes too viscous, leading to difficulty in handling. On the other hand, if the mass ratio is larger than 20 times, improvement in effects corresponding to the amount cannot be particularly admitted, resulting in economical disadvantage.

The imidization reaction or the acid amidization reaction does not particularly require a catalyst. If a catalyst is used, a tertiary amine such as trimethylamine, triethylamine, tributylamine, N,N-dimethylaniline, N,N-diethylaniline and 1,8-diazabicyclo(5,4,0)undecene-7 are preferable.

In the imidization reaction or the acid amidization reaction, the amount ratio of the raw material compound (b) and the diamine salt differs according to the kind of the raw material used or circumstances, and hence cannot be determined unambiguously. However, relative to one mole of the substituted or unsubstituted succinic anhydride group or the substituted or unsubstituted carboxyl group contained in the raw material, the ratio is 1.0 to 10 times, preferably 1.05 to 5.0 times larger, based on the non-neutralized amino group in the diamine. If the ratio is less than 1.0 times, a succinic anhydride group or a carboxyl group remaining without being imidized or acid-amidized after the completion of the reaction tends to be present. As a result, a primary amino group regenerated in the deacidification reaction as the post process is reacted with the succinic anhydride group or the carboxyl group, and gelation occurs due to cross linking, whereby the effects of the invention may be deteriorated. On the other hand, if the molar ratio exceeds 10 times, although there is an advantage that the imidization reaction or the acid amidization reaction proceeds speedy, use of a large amount of a reaction reagent leads to economical disadvantage.

As for the imidization reaction or the acid amidization reaction, although the reaction temperature and the reaction time differ according to the type of the solvent used and the presence or absence of a catalyst, normally, the reaction is conducted at 100 to 300° C., preferably 130 to 260° C., for 1 to 20 hours. If the reaction temperature is lower than 100° C., the reaction may take a prolonged period of time, and if the reaction temperature exceeds 300° C., physical properties may be lowered due to coloring of a reaction product and thermal decomposition of the raw material compound.

No specific restrictions are imposed on the order of charging reaction raw materials or the like, and the raw materials can be put in various modes. Normally, the compound (b) as the raw material is dissolved homogenously in the solvent, and powder or a solution of a salt of the diamine and the acid is added gradually. The raw material may be put in the reverse order. The raw material may be put under reflux with heating of the solvent.

Since the reaction proceeds with the generation of water, the generated water azeotropes together with the solvent used. Therefore, by removing the azeotroping water to the outside of the reaction system by means of a Dean-Stark proportional distributor, the reaction can proceed efficiently.

Completion of the imidization reaction can be confirmed by the fact that the presence of azeotropic water can no longer be admitted and that an increase in absorption intensity of the carbonyl group of the imide around 1700 cm$^{-1}$ can be no longer admitted by infrared absorption spectroscopy which is conducted by collecting part of the reaction measurement. Further, completion of the acid amidizition reaction can be confirmed by the fact that azeotropic water is no longer admitted and that an increase in absorption intensity of the carbonyl group of the acid amide around 1650 cm$^{-1}$ is no longer admitted by infrared absorption spectroscopy which is conducted by collecting part of the reaction measurement.

In the thus obtained reaction mixture, a salt of the compound (a) in which the primary amino group is bonded through an imide bond or an acid amide bond is contained. This reaction mixture is, as it is or after powderization by putting into a nonpolar solvent such as methanol, isopropanol, isobutanol and hexane, in contact with an aqueous solution of a base or, according to need, a methanol/water mixed solution of a base, whereby deacidification is conducted to convert the salt to a free amine.

Specific examples of the base used for deacidification include an aqueous base such as sodium hydroxide, potassium hydroxide, lithium hydroxide, sodium carbonate, potassium carbonate, sodium bicarbonate, potassium bicarbonate, ammonia, methylamine, ethylamine, trimethylamine and triethylamine. Of these, sodium hydroxide, sodium carbonate and sodium bicarbonate are preferable for economical reasons.

The compound (a) can be obtained by the above-mentioned method. As such compound (a), a compound containing 70 to 99.98 mol % of a repeating unit represented by the following formula (I) and 0.02 to 30 mol % of a repeating unit represented by the formula (II), which are obtained by reacting the above compound (b-1) and the diamine represented by the above formula (VI). Further, it is more preferred that the repeating unit represented by the following formula (I) be contained in an amount of 75 to 99.70 mol % and that the repeating unit represented by the following formula (II) be contained in an amount of 0.30 to 25 mol %. It is further preferred that the repeating unit represented by the following formula (I) be contained in an amount of 80 to 99.50 mol % and the repeating unit represented by the following formula (II) be contained in an amount of 0.50 to 20 mol %.

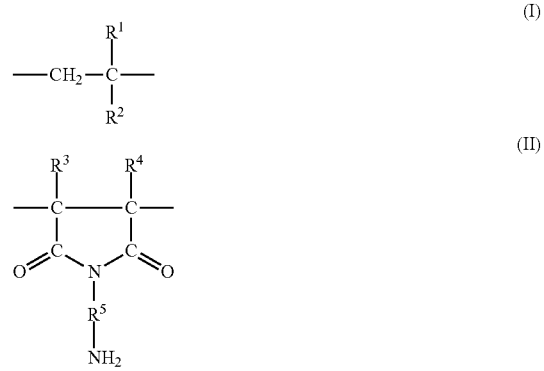

In the formulas (I) and (II), $R^1$ and $R^2$ are independently a hydrogen atom, an alkyl group having 1 to 10 carbon atoms, a cycloalkyl group having 3 to 8 carbon atoms, an aryl group having 6 to 10 carbon atoms, an alkoxy group having 1 to 4 carbon atoms, an alkoxycarbonyl group having 1 to 18 carbon atoms or an alkylcarboxyl group having 1 to 17 carbon atoms.

As the alkyl group, a methyl group, an ethyl group, a propyl group, a butyl group, a pentyl group, a hexyl group, a heptyl group, an octyl group, a nonyl group, a decyl group or the like can be given.

As the cycloalkyl group, a cyclohexyl group, a cyclooctyl group, a cyclodecyl group or the like can be given.

As the aryl group, a phenyl group, a p-methylphenyl group, a m-methylphenyl group or the like can be given.

As the alkoxy group, a methoxy group, an ethoxy group, a propoxy group, a butoxy group or the like can be given.

As the alkoxycarbonyl group, a methoxycarbonyl group, an ethoxycarbonyl group, a propoxycarbonyl group, and a butoxycarbonyl group or the like can be given.

As the alkylcarboxyl group, a methylcarboxyl group, an ethylcarboxyl group, a propylcarboxyl group, a butylcarboxyl group or the like can be given.

$R^3$ and $R^4$ are independently a hydrogen atom or an alkyl group having 1 to 6 carbon atoms.

As the alkyl group, a methyl group, an ethyl group, a propyl group, a butyl group, a pentyl group, a hexyl group or the like can be given.

$R^5$ is an alkylene group having 1 to 12 carbon atoms (preferably an alkylene group having 1 to 8 carbon atoms), a cycloalkylene group having 5 to 17 carbon atoms (preferably a cycloalkylene group having 6 to 10 carbon atoms), an arylene group having 6 to 12 carbon atoms, an arylalkylene group having 7 to 12 carbon atoms (preferably an arylalkylene group having 8 to 10 carbon atoms) or a polyoxyalkylene group having 4 to 30 carbon atoms (preferably a polyoxyalkylene group having 4 to 15 carbon atoms).

As the alkylene group, a methylene group, an ethylene group, a propylene group, a tetramethylene group, a hexamethylene group or the like can be given.

As the cycloalkylene group, a cyclohexylene group, a methylene cyclohexylmethylene group or the like can be given.

As the arylene group, a phenylene group, an oxydiphenylene group or the like can be given.

As the arylalkylene group, a xylylene group or the like can be given.

As the polyoxyalkylene group, a polyoxymethylene group, a polyoxyethylene group, a polyoxypropylene group or the like can be given.

$R^1$ to $R^5$ may be the same or different in each repeating unit.

As for the content of the repeating unit represented by the above formula (II), if it is less than 0.02 mol %, adhesiveness with carbon fibers becomes insufficient, and if it exceeds 30 mol %, affinity for a polyolefin-based resin becomes insufficient.

As the compound for introducing the skeleton represented by the above formula (II), maleic anhydride is preferable.

The compound (a) which is formed of the repeating unit represented by the above formula (I) and the repeating unit represented by the above formula (II) may contain other repeating units than the repeating unit represented by the above formula (I) or the repeating unit represented by the above formula (II) within a range which does not impair the advantageous effects of the invention.

Although the molecular weight of the compound (a) is not particularly restricted, it is preferred that the limiting viscosity (measured in tetralin at 135° C.), which is a standard of the molecular weight, be 0.05 to 1.0 dL/g.

If the limiting viscosity exceeds 1.0 dL/g, the number of molecules of the polymer per unit mass is decreased, and as a result, interface adhesion cannot be increased sufficiently. On the other hand, if the limiting viscosity is less than 0.05 dL/g, coupling effects in the interface phase between the carbon fibers and the resin become insufficient, and as a result, sufficient adhesiveness cannot be obtained.

It is preferred that the compound (a) have an amino group content (mol %) of 0.02 to 30 mol %, more preferably 0.05 to 5.0 mol %.

If the amino group content is less than 0.02 mol %, interaction with the surface of single fibers of the carbon fiber bundle is insufficient, and hence high interface adhesiveness cannot be obtained easily. If the amino group content exceeds 30 mol %, affinity for the polyolefin-based resin becomes insufficient, and hence the interwining with molecules becomes insufficient, leading to difficulty in increasing the interface adhesion.

In the invention, as the compound (a), it is possible to use poly-N-vinylacetamide or the like. Poly-N-vinylacetamide may be a copolymer with ethylene, propylene, butene or the like. The copolymer may be either a random copolymer or a block copolymer.

No specific restrictions are imposed on the carbon fibers used in the invention. Although the carbon fiber may be a single fiber or a carbon fiber bundle obtained by binding a plurality of fibers, a carbon fiber bundle obtained by binding a plurality of single fibers each having a crease in which a difference in height between the highest part and the lowest part in an area where the circumferential length of 2 μm and the length in fiber axis direction of 1 μm is 40 nm or more. Normally, the carbon fiber bundle is in the form in which about 1000 to 50,000 single fibers each having an average diameter of 5 to 8 μm is bundled.

It is preferred that the a difference in height between the highest part and the lowest part in an area where the circumferential length is 2 μm and the length in fiber axis direction is 1 μm be 10% or less of the diameter of a single fiber.

The depth of a crease present on the single fiber surface of the carbon fiber bundle is specified by a difference in height between the highest part and the lowest part in an area where the circumferential length is 2 μm and the length in fiber axis direction is 1 μm. The crease on the single fiber surface means a convex and concave part which has a length of 1 μm or longer in a certain direction. No specific restrictions are imposed on the direction, and the direction may be in parallel with, vertical to or angled relative to the fiber axis direction. Due to the general production method of the carbon fiber bundle, almost parallel to the fiber axis direction creases are present on the normal carbon fiber surface. The difference in height can be estimated based on the shape of the surface which can be obtained by scanning the surface of the single fiber by means of an atomic force microscope (AFM).

In the single fiber of the carbon fiber bundle, it is preferred that the ratio of the major axis to the minor axis (major axis/minor axis) in the cross section be 1.03 to 2.00, with 1.05 to 1.70 being particularly preferable. If the major axis/minor axis is smaller than 1.03, after the sizing treatment, adhesion among single fibers becomes strong due to the action of the sizing agent, and as a result, the fiber bundle is hardly untied into single fibers when mixing and impregnation with a resin. As a result, a shaped product in which the single fibers are uniformly dispersed may not be obtained. On the other hand, if the major axis/minor axis is larger than 2.00, adhesion among the single fibers is weak, and the carbon fiber bundle may be untied easily. As a result, stability of cutting into a specific length and the morphology stability of the carbon fiber bundle after cutting may become deteriorated.

As the carbon fiber bundle having a plurality of single fibers, TR50S, TR30S, TRH50, TR40 and MR60H (all of them are product names) manufactured by Mitsubishi Rayon Co., Ltd. can be given, for example.

As for the single fiber constituting the carbon fiber bundle, one obtained by making an acrylonitrile copolymer or pitch obtained from petroleum or coal into a fiber, followed by carbonization, can be given. As the carbon fibers before being subjected to a sizing treatment by a sizing agent which is mentioned later, a carbonized carbon fiber bundle or a carbon fiber bundle in which an oxygen-containing functional group is introduced on the surface or a carbon fiber bundle which is in the state after pre-sizing (which will be mentioned later in detail) can be given.

The carbon fiber bundle may be in the state of a continuous fiber or may be in the state in which it is cut into a specific length. In the case of the carbon fiber bundle in the state of a continuous fiber, the density weight is preferably 0.2 to 15 g/m, more preferably 0.4 to 10 g/m, with 0.8 to 8 g/m being particularly preferable. A density weight of the carbon fiber bundle of less than 0.2 g/m is economically disadvantageous. On the other hand, if the density weight exceeds 15 g/m, an aqueous dispersion of a sizing agent is hardly permeated into the carbon fiber bundle, making it difficult to produce a carbon fiber bundle having a stable shape. Further, when a carbon fiber-containing resin pellet is produced by using the modified carbon fiber bundle of the invention (pellet producing step), uniform impregnation of the resin in the modified carbon fiber bundle in a resin impregnation tank cannot be attained, leading to the generation of a non-impregnated portion.

On the other hand, in the case of the carbon fiber bundle in the state in which the bundle is cut into a specific length, the density weight is preferably 0.4 to 15 g/m, more preferably 0.6 to 10 g/m, and particularly preferably 0.8 to 8 g/m. If the density weight is less than 0.4 g/m, not only it is economically disadvantageous but also easiness in passage of the introduction process of the modified carbon fiber bundle during the pellet production process may be deteriorated. On the other hand, if the density weight exceeds 15 g/m, permeation of an aqueous dispersion of a sizing agent in the carbon fiber bundle cannot be attained completely, whereby production of the carbon fiber bundle having a stable shape becomes difficult.

Although there are no specific restrictions are imposed on the method of cutting the carbon fiber bundle, a rotary cutter method or the like is preferable. Further, the cutting length (the length of the carbon fiber bundle) is preferably 2 to 30 mm, more preferably 4 to 24 mm, with 6 to 20 mm being particularly preferable. In the rotary cutter method, the cutting length can be adjusted by controlling the distance between tooth tips of the used apparatus.

During the cutting by the rotary cutter method, if the thickness of the carbon fiber bundle becomes too large, problems that cutting may be erroneous, operation may become impossible due to the winding of the carbon fiber bundle around the rotor or the shape of the fiber after cutting may be deteriorated may occur. Therefore, a smaller thickness of the carbon fiber bundle is advantageous. In the case of a thick carbon fiber bundle having a density weight exceeding 1.5 g/m, it is preferable to open the carbon fiber bundle as much as possible so as to allow an aqueous dispersion of a sizing agent to adhere uniformly to the inside of the carbon fiber bundle. Therefore, it is preferable to allow the carbon fiber bundle to run while controlling the width/thickness of the carbon fiber bundle and while avoiding substantial twisting of the carbon fiber bundle by means of a guide roll, a comb guide, a spreader bar or the like.

However, the carbon fiber bundle which has been cut into a specific length tends to be broken longitudinally along the fiber orientation direction with an increase in width. As a result, it becomes difficult to maintain its morphology during production or during use after the production. This tendency is particularly significant in the carbon fiber bundle having a high density weight. Therefore, it is preferred that the width of the guide accompanying the rotary cutter be adjusted to control the width of the carbon fiber bundle such that the ratio of the width to the thickness (width/thickness) of the carbon fiber bundle becomes 3 to 10. If the width/thickness is 3 or more, occurrence of erroneous cutting during the cutting process by means of the rotary cutter can be suppressed. On the other hand, if the width/thickness exceeds 10, while erroneous cutting during cutting occurs less frequently, the thickness of the carbon fiber bundle becomes too small, and as a result, vertical cracking of the carbon fiber bundle after cutting tends to occur. As a result, easiness in the passage of later processes may be deteriorated. In addition, in order to cut the carbon fiber bundle which has a high density weight after opening it to be as thin as that of a versatile carbon fiber bundle, the number of carbon fibers which can be processed simultaneously is decreased. In order to compensate this decrease in number, the width of a cutter should be increased and the processing speed has to be enhanced, whereby facility load may be increased and production efficiency may be lowered.

Meanwhile, it is preferred that cutting of the carbon fiber bundle be conducted for the carbon fiber bundle in the wet state after allowing an aqueous dispersion of a sizing agent to be adhered to the carbon fiber bundle. This cutting utilizes the effect of bundling due to the surface tension of an aqueous dispersion of a sizing agent and the fact that the fiber bundle which is in the wet and soft fiber state can absorb impactive shearing force at the time of cutting to prevent fiber breakage. During this cutting, it is preferred that the carbon fiber bundle be in the wet state having a water content of 20 to 60 mass %, in particular 25 to 50 mass %. If the water content is less than 20 mass %, fiber breakage or scuffing may tend to occur easily during cutting. Further, if the water content exceeds 60 mass %, since an excessive amount of water is adhered to the surface of the single fibers, the single fibers are roundly bundled due to the surface tension of water, and as a result, erroneous cutting or clogging up of a blade may occur more frequently. Further, according to need, in order to adjust the water content, an additional treatment may be conducted before cutting by using water or an aqueous dispersion of a sizing agent. As for the water content measurement, the carbon fiber bundle which has been cut into a specific length is dried at 110° C. for one hour and a difference in mass before and after the drying is determined as the water content.

As the method for drying the carbon fiber bundle after cutting, the hot air drying method or the like can be given. If the hot air drying method is used, not only to increase the evaporation efficiency of water but also to prevent adhesion of the carbon fiber bundles, it is preferable to conduct drying in the state in which the carbon fiber bundle is transferred while being vibrated. If the vibration at the time of drying is too strong, fiber breakage tends to occur easily. As a result, the amount ratio of carbon fiber bundles of which the ratio of the width to the thickness (width/thickness) is less than 3 is increased. Further, if the vibration is too weak, quasi-adhesion of fibers occurs, and as a result, the fibers may be bunched up together. Therefore, adequate vibration conditions are required to be set. In addition, not only to shake off fragmentized carbon fiber bundles, but also to attain good hot air passage, it is more preferable to conduct drying with vibrating while transferring the carbon fiber bundle on the mesh vibrating plate. Further, in order to improve drying efficiency, it is possible to use auxiliary means such as infrared radiation.

The modified carbon fiber used in the invention is obtained by allowing 0.2 to 5.0 mass % of the compound (a) to be adhered to the surface of the single fiber or the carbon fiber bundle as mentioned above.

In the invention, it is preferred that, after allowing the compound (a) to be adhered the carbon fiber bundle, the carbon fiber bundle be subjected to a heat treatment at 200 to 300° C. for 5 seconds to 3 minutes. By conducting a heat treatment, the compound (a) which has been adhered to the surface of the carbon fiber bundle is subjected to a moderate thermal decomposition, and as a result, it is bonded to the surface of the carbon fiber bundle more firmly. As a result, the coupling action between the carbon fiber bundle and the olefin-based resin due to the compound (a) is enhanced, whereby a modified carbon fiber bundle is obtained which is more excellent in the interface adhesion with the olefin-based resin.

A heat-treatment time of 5 seconds to 3 minutes is preferable. If the heat-treatment time is shorter than 5 seconds, the above-mentioned thermal decomposition may become insufficient, whereby effects of improving the coupling action cannot be sufficiently obtained. On the other hand, if the heat-treatment time exceeds 3 minutes, thermal decomposition becomes excessive, and as a result, the molecular weight may be decreased greatly or decomposition and scattering of attached matters may become significant thereby leading to a lower coupling action. More preferably, the heat treatment is conducted at 200 to 300° C. for 5 seconds to 3 minutes. It is further preferred that the heat treatment be conducted at 200 to 260° C. for 15 seconds for 3 minutes, with 220 to 240° C. for 20 seconds to 40 seconds being particularly preferable.

When the carbon fiber bundle is subjected to a heat treatment, a hot air dryer, a panel heater dryer, a muffle furnace, a roll dryer or the like can be used. As for the heat-treatment method, it is possible to conduct a heat treatment by passing the carbon fiber bundle continuously in the above-mentioned drier. Alternatively, a heat treatment can be conducted by a batch process in which a carbon fiber bundle is wound around a tubular material and the thus wound carbon fiber bundle is subjected to a heat treatment in a hot air drier or a panel drier. Preferably, a heat treatment is conducted continuously since a uniform heat treatment is possible.

No specific restrictions are imposed on the atmosphere in which a heat treatment is conducted. The carbon fiber bundle can be treated in air, nitrogen or an inert gas.

When allowing the compound (a) to be adhered to the carbon fiber bundle, a method (sizing treatment) in which the compound (a) is dissolved or dispersed in water singly or in combination with other sizing agents as the sizing agent, and the aqueous dispersion of the sizing agent is adhered to the carbon fiber bundle is preferable. By the sizing treatment, not only convergence property of the carbon fiber bundle can be improved, but also affinity of the resulting modified carbon fiber bundle and the polyolefin-based resin can be improved.

The adhesion amount of the compound (a) can be adjusted by controlling the solid matter concentration of the aqueous dispersion of the sizing agent, as mentioned above.

After allowing the aqueous dispersion of the sizing agent to be adhered to the surface of the carbon fiber bundle by the sizing treatment, it is preferred that the carbon fiber bundle be then subjected to a drying treatment, followed by a heat treatment. By conducting a drying treatment, water in the aqueous dispersion of the sizing agent which has been adhered to the carbon fiber bundle can be evaporated before the heat treatment. As a result, a thermally-decomposed product of the compound (a) can be prevented from scattering with water. Therefore, by conducting a drying treatment before the heat treatment, the compound (a) can be adhered to the surface of the carbon fiber bundle stably and more firmly. No specific restrictions are imposed on the drying method as long as the water in the aqueous dispersion of the sizing agent which has been adhered to the carbon fiber bundle can be evaporated before a heat treatment. A drying treatment can be conducted at 100 to 200° C.

No specific restrictions are imposed on the concentration of the aqueous dispersion of the sizing agent. However, it is preferred that the aqueous dispersion of the sizing agent be diluted with water such that the concentration of the sizing agent becomes 5 to 60 mass %.

Further, in the aqueous dispersion of the sizing agent, it is preferred that an olefin-based thermoplastic elastomer resin be contained as an auxiliary component. An olefin-based thermoplastic elastomer resin imparts the carbon fiber bundle with sufficient bundling property and draping property. Further, a sufficient affinity for a polyolefin-based resin can be ensured.

As the olefin-based thermoplastic elastomer resin, a hydrogenated styrene-based thermoplastic elastomer, an ethylene propylene diene monomer copolymer or the like can be given.

It is preferred that the olefin-based thermoplastic elastomer have a Vicat softening temperature, which is measured according to ASTM D1525-70, of 120° C. or less, more preferably 110° C. or less and particularly preferably 90° C. or less. The reason therefor is that after the aqueous dispersion of a sizing agent is adhered to the single fiber surface of the carbon fiber bundle, the water is then evaporated (drying process) at 100 to 200° C., and if the olefin-based thermoplastic elastomer is sufficiently softened in the drying process, the bundling property of the carbon fiber bundle after the drying is improved.

Since the compound (a) and the olefin-based thermoplastic elastomer has the above-mentioned important role, the lowest content is determined independently in order to develop its role efficiently. The compound (a) and the olefin-based thermoplastic elastomer is preferably 15/1 to 1/1 in terms of mass ratio (compound (a)/olefin-based thermoplastic elastomer).

When a sizing treatment is conducted, taking industrial production into consideration, in respect of safety and economy, it is preferable to use an aqueous emulsion in which a sizing agent is dispersed in water. In this case, in order to allow the components to be dispersed homogenously in water, a surfactant is used as an emulsifier.

No particular restrictions are imposed on the emulsifier. An anionic emulsifier, a cationic emulsifier, a nonionic emulsifier or the like can be used. Of them, an anionic emulsifier or a nonionic emulsifier is preferable in respect of emulsification performance and low cost. In addition, as mentioned later, if a silane coupling agent is added to an aqueous emulsion, a nonionic emulsion is particularly preferable in respect of stability of a silane coupling agent in water and physical stability of a shaped product.

Examples of the nonionic emulsifier include a polyethylene glycol-based emulsifier (a higher alcohol ethylene oxide adduct, an alkylphenol ethylene oxide adduct, a fatty acid ethylene oxide adduct, a polypropylene glycol ethylene oxide adduct, or the like) and a polyvalent alcohol-based emulsifier (an aliphatic acid ester of glycerin, a sorbitol fatty acid ester, a fatty acid alkanolamide or the like). A nonionic emulsifier having an HLB of 8 to 20 is normally used. If a nonionic emulsifier having an HLB outside this range, a stable aqueous emulsion may not be obtained.

Examples of the anionic emulsifier include a carboxylic acid salt-based emulsifier (potassium oleate, sodium oleate or the like), a sulfonic acid salt-based emulsifier (sodium dodecylbenzene sulfonate, ammonium dodecylbenzene sulfonate, sodium dioctylsulfosuccinate, or the like) and a sulfuric acid ester-based emulsifier (sodium lauryl sulfate, ammonium lauryl sulfate).

As the method for emulsification, a method using a batch provided with a stirring blade, a method using a ball mill, a method using a shaker, a method using a high shearing emulsifier such as a Gaulin homogenizer or the like can be given.

Although no specific restrictions are imposed on the emulsifier, normally it suffices that it may be added in an amount of 5 to 30 mass %.

In an aqueous emulsion in which a sizing agent is dispersed, according to need, other sizing agent emulsions (for example, a vinyl acetate resin emulsion, a urethane resin emulsion, an acrylic resin emulsion, an epoxy resin emulsion or the like), a silane coupling agent or an antistatic agent may be contained. Further, a lubricant or a smoothing agent may be contained.

As the silane coupling agent, a silane coupling agent which has at least one of an epoxy group, a vinyl group, an amino group, a methacryl group, an acryl group and a straight-chain alkyl group can be used. A silane coupling agent may be used singly or in combination of two or more. Of the silane coupling agents, an epoxysilane-based agent, an aminosilane-based agent and a straight-chain alkylsilance-based agent having an epoxy group, an amino group or a straight-chain alkyl group within its molecule are preferable.

As the epoxy group of the epoxysilane-based coupling agent, a glycidyl group, an alicyclic epoxy group or the like are preferable. Specific examples of such a silane coupling agent include A-186, A-187, AZ-6137 and AZ-6165 (product names) manufactured by Nippon Unicar Company Ltd.

As the examples of the aminosilane-based silane coupling agent, one having a primary amine, a secondary amine or both can be given. Specific examples thereof include A-1100, A-1110, A-1120, Y-9669 and A-1160 (product names) manufactured by Nippon Unicar Company Ltd.

As examples of the straight-chain aralykyl group of the straight-chain alkylsilane-based silane coupling agent, one having a hexyl group, an octyl group and a decyl group can be given. Specific examples of such a silane coupling agent include AZ-6171 and AZ-6177 (product names) manufactured by Nippon Unicar Company Ltd. and KBM-3103C (product name) manufactured by Shin-Etsu Silicone Co., Ltd.

The added amount of the silane coupling agent is preferably 5 mass % or less relative to 100 mass % of the total amount of components other than water (the total amount of solid matters) of the aqueous emulsion, more preferably 4 mass % or less. If the added amount exceeds 5 mass %, cross linking of the silane coupling agent proceeds, and as a result, the carbon fiber bundle becomes hard and weak, leading to easy occurrence of vertical cracking. Further, interface adhesion may also be lowered.

As examples of the method for a sizing treatment in which an aqueous dispersion of a sizing agent is used, a method in which the carbon fiber bundle is allowed to be in contact with the aqueous dispersion of the sizing agent can be given. Specifically, a touch-roll method in which part of the roll is dipped in the aqueous dispersion of a sizing agent to conduct surface transfer, and then this roll is allowed to be in contact with the carbon fiber bundle formed of single fibers to allow an aqueous dispersion of a sizing agent to be adhered; a dip method in which the carbon fiber bundle formed of single fibers are directly dipped in an aqueous dispersion of a sizing agent, and, according to need, the carbon fiber bundle is passed through a nip roll to adjust the adhesion amount of the aqueous dispersion of a sizing agent, or the like can be given.

In the case of the touch roll method, a method in which the carbon fiber bundle is allowed to contact a plurality of touch rolls, and the aqueous dispersion of the sizing agent is adhered to the carbon fiber bundle in a plurality of stages is particularly preferable in respect of the added amount of a sizing agent or the control of the bundle width.

After the sizing treatment, as mentioned above, it is preferred that a drying treatment and a heat treatment be conducted in sequence.

Before the sizing treatment, the carbon fiber bundle may be subjected to a pre-sizing treatment by using a pre-sizing agent.

In the invention, a pre-sizing treatment means a treatment in which a pre-sizing agent is adhered to the carbon fiber bundle. By this pre-sizing treatment, not only the bundling property of the carbon fiber bundle can be improved, but also affinity of the carbon fiber bundle with the above-mentioned sizing agent can be enhanced.

As the pre-sizing agent, a pre-sizing agent formed of an epoxy resin can be used. Such a pre-sizing agent is preferable since it is excellent in affinity for the single fibers of the carbon fibers or handling property, and it can bundle the single fibers in a small amount. Further, the carbon fiber bundle which is subjected to a pre-sizing treatment by this pre-sizing agent has excellent process passage property since it is not wound around the roller in the later sizing process. In addition, wettability of the carbon fiber bundle for the sizing agent is improved by a pre-sizing treatment, and as a result, it becomes possible to allow the sizing agent to be adhered uniformly.

When the carbon fiber bundle is subjected to a pre-sizing treatment by using a pre-sizing agent, a water-based pre-sizing solution obtained by dissolving or dispersing a water-soluble or a water-dispersible epoxy resin in water is usually used.

No particular restrictions are imposed on a water-soluble or water-dispersible epoxy resin, and a known epoxy resin can be used. If used in a water-based system, a modified epoxy resin can be used. These epoxy resins can be used alone or in a mixture of two or more. In respect of the above-mentioned passage property in the sizing treatment, it is more preferable to use two types of epoxy resins in combination, i.e. one which is liquid at room temperature and one which is solid at room temperature.

As the water-soluble epoxy resin, one having glycidyl groups at the both ends of an ethylene glycol chain or one in which ethylene oxide is added to the both ends of A-type, F-type, S-type or the like of bisphenol and glycidyl groups are present at the both sides thereof. One having an alicyclic epoxy group instead of the glycidyl group can also be used.

As the water-dispersible epoxy resin, a bisphenol A-type epoxy resin, a bisphenol F-type epoxy resin, a bisphenol S-type epoxy resin, a phenol novolak type epoxy resin, a cresol novolak type epoxy resin, a biphenyl type epoxy resin, a naphthalene skeleton type epoxy resin, an aliphatic epoxy resin, dicyclopentadiene type epoxy resin (HP7200 (product name) manufactured by Dainippon Ink & Chemicals, Inc, for example.), a glycidylamine-type epoxy resin, DPP novolak type epoxy resin (Epikote 157S65 (product name) manufactured by Japan Epoxy Resins, Co., Ltd, for example.) or the like can be given. It is also possible to use one having an alicyclic epoxy group instead of a glycidyl group.

When a pre-sizing agent formed of a water-dispersible epoxy resin is used, it is preferable to conduct a pre-sizing treatment by using an aqueous emulsion to which an emulsifier has been further added. Although no specific restrictions are imposed on the emulsifier, an anionic emulsifier, a cationic emulsifier, a nonionic emulsifier or the like can be used. Of them, an anionic emulsifier or a nonionic emulsifier is preferable due to excellent emulsification performance and low cost. A nonionic emulsifier is particularly preferable since it does not inhibit the stability of a sizing agent.

The amount of a pre-sizing agent which is adhered to the carbon fiber bundle by a pre-sizing treatment is preferably 0.1 to 2.0 mass %, more preferably 0.2 to 1.2 mass %, relative to the total amount of the carbon fiber bundle. If the adhesion amount of a pre-sizing agent is within the above-mentioned range, the number of molecule layers of molecules of a pre-sizing agent covering the single fiber surface of the carbon fibers will be optimum, i.e. about 1 to 3 layers. If the adhesion amount is less than 0.1 mass %, effects of allowing a pre-sizing agent to be adhere are not developed, and as a result, a carbon fiber bundle which is improved in process passage property, handling property and affinity for a sizing agent may not be obtained. On the other hand, if the adhesion amount exceeds 2.0 mass %, a pre-sizing agent is present among the single fibers to cause bridging. As a result, due to quasi-adhesion of the single fibers, movement between single fibers is restricted to suppress spreading of the carbon fiber bundle. As a result, the uniformity of the carbon fiber bundle may deteriorate. Further, the following may occur. The permeability of a sizing agent to be adhered in the later sizing process is suppressed, so that the properties of carbon fiber bundle are degraded. For example, uniform carbon fiber bundles cannot be obtained. The adhesion amount of the pre-sizing agent is measured by according to JIS R7604. Specifically, the adhesion amount of a pre-sizing agent after the pre-sizing treatment is measured by the Soxhlet extraction method with methyl ethyl ketone.

The modified carbon fibers used in the invention are modified carbon fibers in which 0.2 to 5.0 mass % of an amino group-containing modified polyolefin resin (compound (a)) is adhered to the single fiber of the carbon fibers or the carbon fiber bundle. The modified carbon fiber may be either a single fiber of the modified carbon fiber or a modified carbon fiber bundle.

As for the compound (a), the amino group in its molecule increases the interaction with the surface of the carbon fibers.

It is a component which serves as an effective coupling agent which causes strong interaction between the compound (a) and the acid-modified polyolefin resin and also causes strong bonding with a polyolefin-based resin due to molecule interwinding of polyolefin chains of the skeleton of these. Accordingly, the modified carbon fibers in which the compound (a) is adhered to the surface of carbon fibers in an amount of 0.2 to 5 mass % can develop good interface adhesion with a polyolefin-based resin, and hence, is suited for compositization.

In particular, if modified carbon fibers obtained by adhering 0.2 to 5 mass % of the compound (a) to the surface of the carbon fibers, followed by a heat treatment at 200 to 300° C. for 5 seconds to 3 minutes is compositized with a polyolefin-based resin, a thermoplastic resin composition which is more improved in tensile stress at break, bending strength, impact strength and modulus in bending can be obtained.

As for the amount ratio (mass ratio) of the components (A) to (C) in the composition of the invention, the amount ratio (A):(B) is 0 to 99.5:100 to 0.5. If the amount of the component (B) is less than 0.5, the effect of composition of these components may not be obtained sufficiently. In order to obtain compositization effects efficiently, the amount ratio is preferably 80 to 99:20 to 1.

Further, the amount ratio [(A)+(B)]:(C) is 40 to 97:60 to 3 in mass ratio, preferably 50 to 95:50 to 5. If the amount ratio of (C) is less than 3, effects of improving physical properties of a shaped product may be insufficient. If the amount ratio of (C) exceeds 60, further significant improvement effects is not obtained, and process stability during the pellet production may be lowered, and spots or the like may be generated in a pellet, thereby to deteriorate the quality stability of a shaped product.

As other components, according to applications, various additives such as an anti-oxidant, a colorant, an anti-static agent, a stabilizer, a foaming agent or the like can be added.

Further, according to need, an inorganic filler such as glass fibers, talc, mica, sodium carbonate or the like can be added.

The fiber-reinforced resin composition of the invention is preferably a long fiber pellet, and can be produced by the following method, for example. Specifically, a long fiber-reinforced resin pellet can be obtained by introducing several thousands of modified carbon fiber (C) bundles into a impregnation die such that the polyolefin resin (A) and the acid-modified polyolefin resin (B) are uniformly impregnated between the filaments, and the resulting bundles are then cut into a necessary length. For example, while supplying a molten resin from an extruder to an impregnation die provided at the tip of the extruder, the continuous modified carbon fiber bundles are passed to allow the molten resin to be impregnated with the modified carbon fiber bundles, and the modified carbon fiber bundles are withdrawn through the nozzle, and then pelletized into a specific length.

The short fiber pellet can be produced by melting and kneading the components (A) to (C). Further, the pellet length is preferably 3 to 100 mm, more preferably 5 to 50 mm.

The resin composition of the invention comprises the carbon fiber-reinforced resin composition of the invention and a thermoplastic resin (diluted resin). The thermoplastic resin may be the same as or different from the polyolefin resins (A) and (B) contained in the carbon fiber-reinforced resin composition. Although no restrictions are imposed on the diluted resin, the above-mentioned polyolefin resin is preferable. The content of the modified carbon fiber (C) contained in the resin composition is 3 to 60 mass %, preferably 5 to 50 mass %.

The diluted resin is normally added in an amount of 0 to 1900 parts by mass relative to 100 parts by mass of the carbon fiber-reinforced resin composition such that the content of the modified carbon fiber (C) in the total resin composition is included in the above-mentioned range. It is preferred that the content be 10 parts by mass to 500 parts by mass.

It is preferred that the resin composition be produced by mixing the carbon fiber-reinforced resin composition and the diluted resin in the form of pellets.

The shaped product of the invention is produced from the above-mentioned carbon fiber-reinforced resin composition or the resin composition.

The shaped product can be produced by a known method such as the injection molding method, the extrusion molding method, the blow molding method, the compression molding method, the injection compression molding method, the gas-assisted injection molding method and the foam injection molding method or the like using the carbon fiber-reinforced resin composition or the resin composition.

The shaped product may contain an anti-oxidant, a light stabilizer, a light absorbing agent, a metal inactivating agent, a pigment, a rubber, a filler or the like.

EXAMPLES

The invention will be described in more detail with reference to the following examples. However, the invention will not be restricted by the following examples.

The measurement and evaluation of various properties in these examples will be conducted by the following method.

(1) Measurement of the Depth of a Crease on the Single Fiber Surface of Carbon Fiber Bundle The depth of a crease present on the single fiber surface is specified by the difference between the highest part and the lowest part in a region of the circumferential length of 2 μm×fiber axis length direction of 1 μm. The difference in height was measured based on the shape of the surface obtained by scanning the single fiber surface by means of a scanning atomic force microscope (AFM). Specifically, the depth was measured as follows.

Several single fibers of the carbon fiber bundle were placed on a sample table, and the both sides thereof were fixed. Further, dotite was put around to obtain a measurement sample. By means of an atomic force microscope ("SPI3700/SPA-300" (product name)) manufactured by Seiko Instruments Inc., and a cantilever made of silicon nitride, a range of 2 to 7 μm in the circumferential direction of the single fiber was repeatedly scanned in an AFM mode while shifting gradually in a length of 1 μm in the fiber axis direction. The thus obtained measured screen was subjected to two-dimensional Fourier transformation to cut the low frequency components off, and inverse transformation was conducted. From the plane image of the thus obtained single fiber from which the ratio of curvature was removed, the difference in height between the highest part and the lowest part was read in a region of a circumferential length of 2 μm×fiber axis direction length of 1 μm.

(2) Calculation of the Major Axis and the Minor Axis (Major Axis/Minor Axis) of the Single Fiber Cross Section of the Carbon Fiber Bundle The carbon fiber bundle for the measurement was passed through a tube formed of a vinyl chloride resin having an inner diameter of 1 mm, and the tube was cut in round slices by means of a knife to prepare a sample.

The sample was adhered to a SEM sample table such that the cross section turned upward. Further, Au was sputtered in a thickness of about 10 nm, and the cross section was observed under the conditions of an accelerated voltage of 7.00 kV and a working distance of 31 mm by means of a scanning electron microscope ("XL20 (product name)", manufactured by PHILIPS), and the major axis and the minor axis of the single fiber cross section were measured.

(3) Measurement of Strand Strength and Strand Elastic Modulus

Measured according to JIS R7608.

(4) Measurement of the Adhesion Amount of a Sizing Agent

According to SRM14-90 of the SACMA method, the total amount of the sizing agent which had been adhered to the carbon fiber bundle was measured according to the thermal decomposition method based on a difference between mass before and after the thermal decomposition treatment. The ratio of adhesion was obtained by the following formula (I):

$$\text{Ratio of adhesion}(\%) = 100 \times (W1 - W2)/W1 \quad (1)$$

W1: Mass of the carbon fibers before the thermal decomposition treatment

W2: Mass of the carbon fibers after the thermal decomposition treatment (5) Measurement of Limiting Viscosity [η]

The limiting viscosity [η] of the amino group-containing modified polyolefin resin was measured by means of an automatic viscosity meter ("VNR-53" manufactured by Rigo Co., Ltd.). As the solvent, tetralin to which 1 g/L of 2,6-di-t-butyl-4-methylphenol (hereinafter referred to as the "BHT") was used as an antioxdent, and measurement was conducted by means of an Ubbelohde viscometer at a measurement temperature of 135° C. and a sample concentration of 0.8 to 1.6 g/L.

(6) Measurement of Amino Group Content

The amino group content of the amino group-containing modified polyolefin resin was measured according to the method described in Macromolecules, Vol. 26, pages 2087 to 2088 (1993).

1.0 g of an amino group-containing modified polyolefin, 50 mL of p-xylene, 10 mL of pyridine and 5 mL of benzoyl chloride were placed in a 200 mL-two neck flask. The flask was subjected to reflux with heating in a nitrogen atmosphere at 140° C. for 6 hours, whereby a polymer solution was obtained.

Subsequently, the resulting polymer solution was added to 1 L of methanol, followed by sufficient stirring. The deposited solid portion (polymer) was collected by filtration. Further, the polymer was washed with methanol several times, followed by drying in vacuum at 80° C. for 6 hours. The thus obtained polymer was subjected to press molding at 190° C., and an infrared absorption spectrum was measured.

For the quantitative analysis of the amino group, the ratio of absorbance of the absorption (1645 cm$^{-1}$) of a carbonyl group (C=O) generated by a reaction of an amino group and benzoyl chloride and an absorption band specific to polyolefin. For the quantitative analysis, a calibration curve was prepared from an infrared absorption spectrum of a blend (190° C., a press-molded product) of polyolefin powder and various amounts of 1-butyl(2-methylproypl)benzamide. This calibration curve was used.

(7) Measurement of Melt Flow Rate (MFR)

Measured according to JIS K 7210 at a temperature of 230° C. at a load of 2.16 kg.

(8) Evaluation of Tensile Stress at Break

Measured according to JIS K 7161.

(9) Evaluation of Bending Strength and Bend Elastic Constant

Measured according to JIS K 7171.

(10) Evaluation of Charpy Impact Strength

Measured according to JIS K 7111.

Production Example 1

Production of Amino Group-Containing Modified Polyolefin Resin (Compound (a-1))

(1) Preparation of a Partially-Neutralized Sodium Salt of P-Toluenesulfonic Acid of Ethylenediamine In a separable flask having an inner volume of 5 L provided with a thermometer, a stirrer, a dropping funnel and a reflux condenser, 1.5 L of methanol and 475 g (2.5 mol) of p-toluenesulfonic acid monohydrate were placed such that the p-toluenesulfonic acid monohydrate was dissolved in methanol. While cooling in ice bath, a solution obtained by dissolving 750 g (12.5 mol) of ethylenediamine in 1.5 L of ethanol was added dropwise at a speed which could keep the temperature of 10 to 20° C. After the completion of the dropwise addition, the solution was heated to 70° C. Then, the pressure was reduced to distill methanol and unreacted ethylenediamine off, whereby 633 g of white solids were deposited.

The thus obtained while solids were taken out, and the solids were formed into a slurry with 1.5 L of toluene, followed by filtration. Further, the white solids were washed twice with 0.5 L of toluene, and the resulting white powder was dried under reduced pressure. The yield was 540 g. This white powder was added dropwise to 0.5N hydrochloric acid by using bromophenol blue as an indicator, and was found to be 4.21×10$^{-3}$ eq/g. As a result, the white powder was confirmed to be a mono-neutralized sodium salt of p-toluenesulfonic acid of ethylenediamine.

(2) Preparation of Compound (a-1)

In a separable flask having an inner volume of 5 L provided with a thermometer, a stirrer, a dropping funnel and a Dean-Stark proportional distributor, 3 L of p-xylene and 500 g of an ethylene-ethyl acrylate-maleic anhydride (mass ratio: 67.8/29.1/3.1) copolymer (mass average molecular weight: Mw=50000 and number average molecular weight: 20000) were placed. The resulting solution was heated by using oil bath, and the copolymer was dissolved at 140° C. under the reflux of p-xylene.

Subsequently, 390 g of a solution of 1,3-dimethyl-2-imidazolidinone (DMI) containing 75.0 g of the partially-neutralized sodium salt of p-toluenesulfonic acid prepared in (1) above was gradually added dropwise over 3 hours. During that time, the reaction mixture was kept at a temperature of a p-xylene reflux. As a result of imidization, water which was generated and azeotroped was removed outside by means of a Dean-Stark proportional distributor.

After continuing the reaction for 10 hours after the start of the dropwise addition of the partially-neutralized sodium salt of p-toluenesulfonic acid, cooling was conducted. The reaction mixture was put in 25 L of methanol, and the reaction products were collected as a precipitate. The precipitate was immersed in a water/methanol solution (volume ratio: 1/1) containing 30 g of potassium carbonate, followed by filtration. The filtrate was sufficiently washed with water and methanol, and dried, whereby compound (a-1) was obtained. The yield was 500 g.

Part of the thus obtained compound (a-1) was press-molded at 190° C., and the infrared spectrum thereof was measured. Absorption derived from an amino group was observed at 3400 cm$^{-1}$ and absorption derived from an imide ring was observed at 1775 cm$^{-1}$ and 1695 cm$^{-1}$. From this, it was confirmed that an intended amino group-containing modified polyolefin resin was obtained.

The limiting viscosity (measured in tetralin at 135° C.) of the thus obtained compound (a-1) was 0.3 dL/g. The amino group content was 1.0 mol %.

Production Example 2

Production of Modified Carbon Fiber Bundle (1) Preparation of an Aqueous Dispersion of a Sizing Agent By using an amino-group containing modified polyolefin resin obtained in Production Example 1 (compound (a-1)), an aqueous dispersion of a sizing agent was prepared by the following method.

First, the amino group-containing modified polyolefin resin was pulverized to powder having a particle size of 20 μm or less. This powder and a nonionic surfactant ("Pluronic F-108 (product name)") were mixed in a mass ratio (powder/surfactant) of 80/20 to prepare a sizing agent. The sizing agent was dispersed in water by means of a homogenizer having a high shearing stirring blade such that the concentration of the sizing agent became 35 mass %. Subsequently, the sizing agent was passed through an ultra-high pressure homogenizer ("microfluidizer M-110-E/H", manufactured by Mizuho Industrial Co., Ltd.) three times, whereby a stable aqueous emulsion (an aqueous dispersion of a sizing agent) was obtained.

The concentration of the sizing agent in the thus obtained aqueous dispersion of the sizing agent was 34 mass % and the average particle diameter was 0.2 μm.

(2) Preparation of Modified Carbon Fiber Bundle (CF-1)

As the carbon fiber bundle, a carbon fiber bundle obtained by using polyacrylic fibers as a raw material ("TR50S-15L", Mitsubishi Rayon Co., Ltd., a product which has not been subjected to a pre-sizing treatment) was used. The physical properties of the carbon fiber bundle are shown in Table 1.

TABLE 1

| Carbon fiber bundle (raw material) | TR50S-15L |
|---|---|
| Depth of crease (nm) | 100 |
| Major axis/Minor axis | 1.1 |
| Weight density (g/m) | 1.0 |
| Number of filaments | 15,000 |
| Strength of strand (MPa) | 4900 |
| Modulus of elasticity of strand (GPa) | 240 |

An aqueous dispersion of a sizing agent prepared by using the compound (a-1) as the amino group-containing modified polyolefin resin was diluted so that the concentration thereof became 2.0 mass %. The carbon fiber bundle was immersed in an immersion tank having a free roller which was filled with this dispersion. Thereafter, the carbon fiber bundle was dried with hot air at 150° C. for 1 minute, and then wound around a bobbin, whereby a modified carbon fiber bundle (CF-1) was obtained. The adhesion amount of the sizing agent of the thus obtained modified carbon fiber bundle (CF-1) was shown in Table 2.

(3) Modified Carbon Fiber Bundle (CF-2)

In the production of the previous modified carbon fiber bundle (CF-1), the carbon fiber bundle (CF-1) was withdrawn from the carbon fiber bundle which was wound around the bobbin. The thus withdrawn carbon fiber bundle (CF-1) was subjected to a heat treatment in a muffle furnace at 230° C. for 25 seconds. Thereafter, the carbon fiber bundle was again wound around the bobbin, whereby a modified carbon fiber bundle (CF-2) was obtained. The heat treatment was conducted in air. The amount of the sizing agent which was adhered to the thus obtained modified carbon fiber bundle (CF-2) was shown in Table 2.

(4) Modified Carbon Fiber Bundle (CF-3)

An aqueous dispersion of a sizing agent (concentration: 2.8 mass %) was prepared in the same method as in the preparation method of the above-mentioned aqueous dispersion of a sizing agent, except that the maleic anhydride modified polypropylene resin ("H-1100P" manufactured by Toyo Kasei Co., Ltd., having a limiting viscosity measured in tetralin at 135° C. of 0.58 dl/g, the content of maleic anhydride: 5.6 mass %) was used instead of the compound (a). A modified carbon fiber bundle (CF-3) was obtained in the same manner as in the production of the carbon fiber bundle (CF-1), except that the carbon fiber bundle was immersed in an immersion tank provided with a free roller filled with this aqueous dispersion of a sizing agent. The adhesion amount of the sizing agent of the resulting modified carbon fiber bundle (CF-3) is shown in Table 2.

TABLE 2

| | Modified carbon fiber bundle | | |
|---|---|---|---|
| | CF-1 | CF-2 | CF-3 |
| Carbon fiber bundle (raw material) | TR50S-15L | TR50S-15L | TR50S-15L |
| Main components of sizing agent | (a-1) | (a-1) | Maleic anhydride modified polypropylene |
| Drying treatment temperature (° C.) | 150 | 150 | 150 |
| Heat treatment conditions   Treatment temperature (° C.) | None | 230 | None |
| Treatment time (sec) | | 25 | |
| Adhesion amount of a sizing agent (mass %) | 0.6 | 0.6 | 0.8 |

Examples 1 to 5 and Comparative Example 1

A carbon fiber-containing pellet was produced by the following method using a polyolefin resin, an acid-modified polyolefin resin and a modified carbon fiber bundle of the kind and amount shown in Table 3.

The resin shown in Table 3 is as follows.

(1) Polyolefin Resin (A)

PP-1: Polyolefin homopolymer ("J-3000GV" manufactured by Prime Polymer Co., Ltd., MFR=30 g/10 min)

PP-2: Polypropylene homopolymer ("H-50000" manufactured by Prime Polymer Co., Ltd., MFR=500 g/10 min)

(2) Acid-Modified Polyolefin Resin (B)

MPP-1: Maleic anhydride acid-modified polypropylene ("H-1100P" manufactured by Toyo Kasei, Co., Ltd., having a limiting viscosity measured in tetralin at 135° C. of 0.58 dl/g, content of maleic anhydride: 5.6 wt %)

First, PP-1, PP-2 and MPP-1 were mixed in an amount shown in Table 3. The mixture was molten at 280° C. and supplied to an impregnation tank in a die from an extruder.

Separately, the modified carbon fiber bundle in an amount shown in Table 3 was heated by passing through a pre-heating part of 200° C. Then, the pre-heated modified carbon fiber bundle was introduced into an impregnation tank to which the above-mentioned molten resin heated to 280° C. had been supplied. After adjusting the supply speed to 10 m/min, the modified carbon fiber bundle was supplied to a die. The modified carbon fiber bundle was impregnated with the molten resin in the impregnation tank, and then withdrawn from the die and cooled, cut by means of a pelletizer to obtain a carbon fiber-containing pellet having a length of 8 mm and a diameter of 2.2 mm.

100 parts by mass of the resulting carbon fiber containing pellet and PP-1 as a diluting resin in amounts shown in Table 3 were mixed to produce a carbon fiber-reinforced polypropylene resin blend.

The resulting carbon fiber-reinforced polypropylene resin blend was subjected to injection molding, and a test specimen for the measurement standard of the above-mentioned evaluation item was prepared. Then, the mechanical performance (tensile stress at break, bending strength, bend elastic constant, charpy impact strength) was evaluated. The results are shown in Table 3.

TABLE 3

|  | Constitution components |  | Unit | Examples 1 | 2 | 3 | 4 | 5 | Com. Ex. 1 |
|---|---|---|---|---|---|---|---|---|---|
| Carbon fiber containing pellet | Polyolefin resin | PP-1 | Mass % | 28 | 28 | 27 | 27 | 27 | 28 |
|  |  | PP-2 |  | 28 | 28 | 27 | 27 | 27 | 28 |
|  | Acid modified polyolefin resin | MPP-1 |  | 4 | 4 | 6 | 6 | 6 | 4 |
|  | Modified carbon fiber bundle | CF-1 |  | 40 |  |  |  |  |  |
|  |  | CF-2 |  |  | 40 | 40 | 40 | 40 |  |
|  |  | CF-3 |  |  |  |  |  |  | 40 |
| Resin blend | Dilute resin (PP-1) |  | Parts by mass | 100 | 100 | 100 | 33 | 0 | 100 |
|  | Amount of carbon fibers in a resin blend |  | Mass % | 20 | 20 | 20 | 30 | 40 | 20 |
| Evaluation of physical properties | Tensile strength at break |  | MPa | 158 | 181 | 167 | 178 | 200 | 145 |
|  | Bending strength |  | MPa | 220 | 253 | 256 | 282 | 295 | 195 |
|  | Bend elastic constant |  | MPa | 12700 | 12800 | 12800 | 17500 | 22200 | 11400 |
|  | Charpy impact strength (23° C., notched) |  | kJ/m$^2$ | 18 | 19 | 20 | 23 | 25 | 16 |

The shaped product obtained in Examples 1 to 5 were excellent in tensile stress at break, bending strength, bend elastic constant, charpy impact strength and also have their properties in a well-balanced manner.

INDUSTRIAL APPLICABILITY

The carbon fiber-reinforced resin composition and a shaped product obtained by using the same are used in automobile components (frond end, fan shroud, cooling fan, engine cover, engine undercover, radiator box, side door, back door inner, back door outer, outer panel, door handle, luggage box, wheel cover, cooling module, air cleaner case, pedal or the like), a two-wheeled or bicycle components, house-related components (bath room components, a toilet sheet of washlet, legs of a chair, valves, meter boxes, or the like).

The invention claimed is:

1. A carbon fiber-reinforced resin composition, comprising:
   (A) a polyolefin resin,
   (B) an acid-modified polyolefin resin, and
   (C) a modified carbon fiber with an adhesion amount of an amino group-containing modified polylolefin resin of from 0.2 to 5.0 mass %,
   wherein the amino group-containing modified polyolefin resin is a reaction product of:
   a compound selected from the group consisting of an ethylene-ethylacrylate-maleic anhydride copolymer, a maleic anhydride graft polyethylene-based resin, and a maleic anhydride graft polypropylene-based resin and
   a compound comprising two or more amino groups, and
   wherein a mass ratio of (A):(B) is from 0:100 to 99.5:0.5, and
   a mass ratio [(A)+(B)]:(C) is from 40:60 to 97:3.

2. The composition of claim 1, wherein the mass ratio of (A):(B) is from 80:20 to 99:1.

3. The composition of claim 1, wherein the mass ratio of [(A)+(B)]:(C) is from 50:50 to 95:5.

4. The composition of claim 1, wherein the modified carbon fiber (C) is obtained by a process comprising:
   allowing the amino group-containing modified polyolefin resin to adhere to a surface of a carbon fiber, followed by
   heat treating the carbon fiber at from 200 to 300° C. for from 5 seconds to 3 minutes.

5. The composition of claim 1, wherein the modified carbon fiber (C) is obtained by a process comprising:
   allowing the amino group-containing modified polyolefin resin to adhere to a surface of a carbon fiber, followed by
   heat treating the carbon fiber at from 220 to 240° C. for from 20 seconds to 40 seconds.

6. The composition of claim 1, wherein the amino group-containing modified polyolefin resin has a limiting viscosity, measured in tetralin of 135° C., of from 0.05 to 1.0 dL/g.

7. The composition of claim 1, wherein the polyolefin resin (A) is a homopolymer or copolymer comprising an α-olefin.

8. The composition of claim 1, wherein the polyolefin resin (A) is a block copolymer, a random copolymer, or a graft copolymer.

9. The composition of claim 1, wherein a melt flow rate of the polyolefin resin (A) is from 10 to 500 g/10 minutes at 230° C. under a load of 2.16 kg according to JIS K7210.

10. The composition of claim 1, wherein the polyolefin resin (A) and the acid-modified polyolefin resin (B) are both a polypropylene-based resin.

11. The composition of claim 1, wherein a limiting viscosity of the acid-modified polyolefin resin (B) is from 0.1 to 3.0 dL/g, as measured in tetralin at 135° C.

12. A resin composition, comprising:
   the composition of claim 1 and
   a thermoplastic resin,
   wherein a content of the modified carbon fiber (C) is from 3 to 60 mass %.

13. A shaped product comprising:
   the composition of claim 1.

14. A shaped product comprising the composition of claim 9.

15. A carbon fiber-reinforced resin composition, comprising:
   (A) a polyolefin resin,
   (B) an acid-modified polyolefin resin, and
   (C) a modified carbon fiber with an adhesion amount of an amino group-containing modified polyolefin resin of from 0.2 to 5.0 mass %,
   wherein the amino group-containing modified polyolefin resin is a copolymer comprising from 70 to 99.98 mol % of a repeating unit of formula (I) and from 0.02 to 30 mol % of a repeating unit of formula (II):

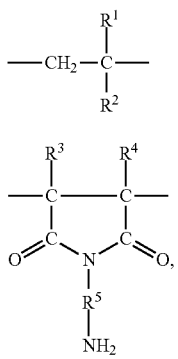

wherein $R^1$ and $R^2$ are each independently a hydrogen atom, an alkyl group having 1 to 10 carbon atoms, a cycloalkyl group having 3 to 8 carbon atoms, an aryl group having 6 to 10 carbon atoms, an alkoxy group having 1 to 4 carbon atoms, an alkoxycarbonyl group having 1 to 18 carbon atoms, or an alkylcarboxyl group having 1 to 17 carbon atoms;

$R^3$ and $R^4$ are each independently a hydrogen atom or an alkyl group having 1 to 6 carbon atoms;

$R^5$ is an alkylene group having 1 to 12 carbon atoms, a cycloalkylene group having 5 to 17 carbon atoms, an arylene group having 6 to 12 carbon atoms, an arylalkylene group having 7 to 12 carbon atoms, or a polyoxyalkylene group having 4 to 30 carbon atoms, and $R^1$ to $R^5$ may be the same or different in each repeating unit, and wherein the mass ratio of (A):(B) is from 0:100 to 99.5:0.5, and a mass ratio [(A)+(B)]:(C) is from 40:60 to 97:3.

16. The composition of claim 15, wherein the mass ratio of (A):(B) is from 80:20 to 99:1.

17. The composition of claim 15, wherein the mass ratio of [(A)+(B)]:(C) is from 50:50 to 95:5.

18. The composition of claim 15, wherein the modified carbon fiber (C) is obtained by a process comprising:
allowing the amino group-containing modified polyolefin resin to adhere to a surface of a carbon fiber, followed by heat treating the carbon fiber at from 200 to 300° C. for from 5 seconds to 3 minutes.

19. The composition of claim 15, wherein the modified carbon fiber (C) is obtained by a process comprising:
allowing the amino group-containing modified polyolefin resin to adhere to a surface of a carbon fiber, followed by heat treating the carbon fiber at from 220 to 240° C. for from 20 seconds to 40 seconds.

20. The composition of claim 15, wherein the amino group-containing modified polyolefin resin has a limiting viscosity, measured in tetralin of 135° C., of from 0.05 to 1.0 dL/g.

21. The composition of claim 15, wherein the polyolefin resin (A) is a homopolymer or copolymer comprising an α-olefin.

22. The composition of claim 15, wherein the polyolefin resin (A) is a block copolymer, a random copolymer, or a graft copolymer.

23. The composition of claim 15, wherein a melt flow rate of the polyolefin resin (A) is from 10 to 500 g/10 minutes at 230° C. under a load of 2.16 kg according to JIS K7210.

24. The composition of claim 15, wherein the polyolefin resin (A) and the acid-modified polyolefin resin (B) are both a polypropylene-based resin.

25. The composition of claim 15, wherein a limiting viscosity of the acid-modified polyolefin resin (B) is from 0.1 to 3.0 dL/g, as measured in tetralin at 135° C.

26. A resin composition, comprising:
the composition of claim 15 and
a thermoplastic resin,
wherein a content of the modified carbon fiber (C) is from 3 to 60 mass %.

27. A shaped product comprising:
the composition of claim 15.

28. A shaped product comprising the composition of claim 26.

* * * * *